Oct. 14, 1969

G. E. BENSON ET AL 3,472,015

SPUN ROVING

Original Filed March 20, 1964

INVENTORS
GUSTAV E. BENSON &
BY WILLIAM C. SHAFER

ATTORNEYS

INVENTORS
GUSTAV E. BENSON &
WILLIAM C. SHAFER
BY
ATTORNEYS

Oct. 14, 1969       G. E. BENSON ET AL       3,472,015
                        SPUN ROVING
Original Filed March 20, 1964              6 Sheets-Sheet 3
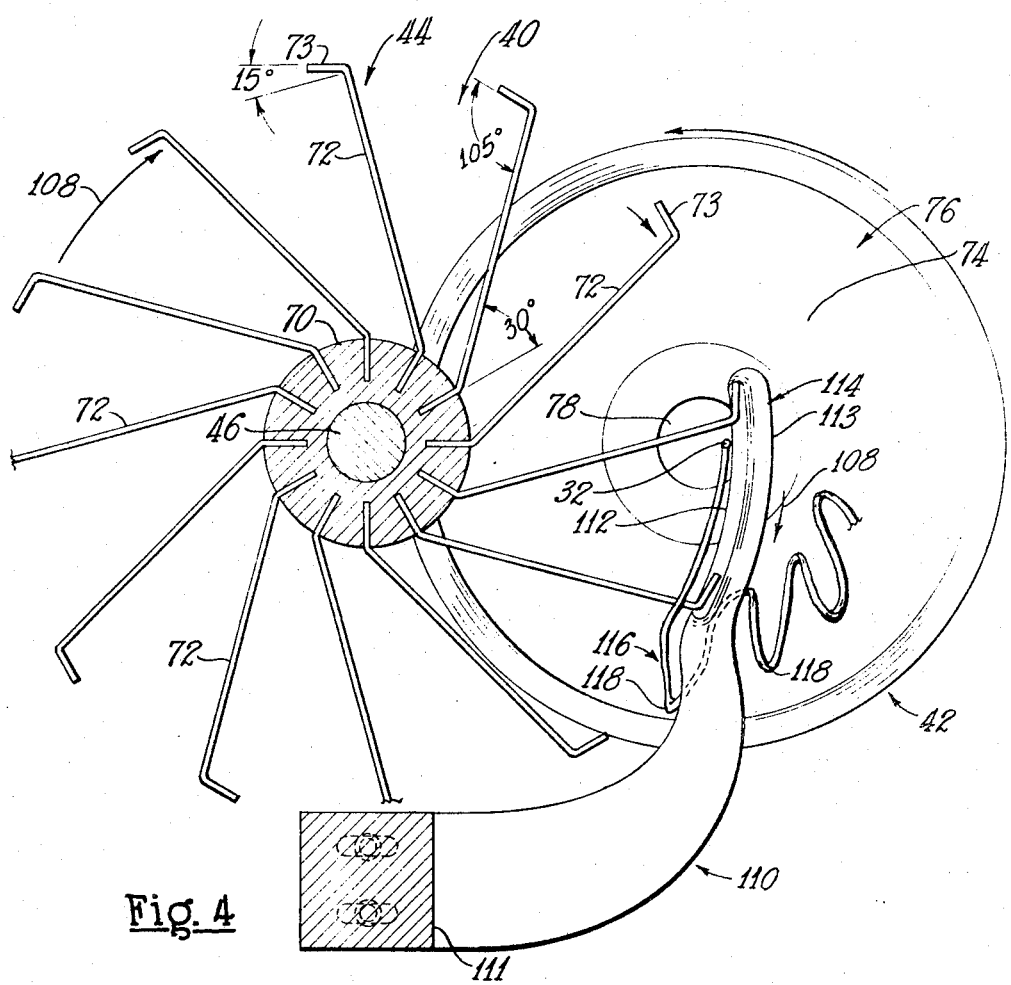
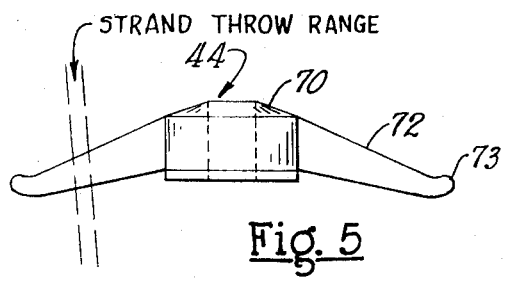
INVENTORS
GUSTAV E. BENSON &
BY WILLIAM C. SHAFER
ATTORNEYS Oct. 14, 1969   G. E. BENSON ET AL   3,472,015
SPUN ROVING Original Filed March 20, 1964   6 Sheets-Sheet 3

INVENTORS
GUSTAV E. BENSON &
BY WILLIAM C. SHAFER

ATTORNEYS

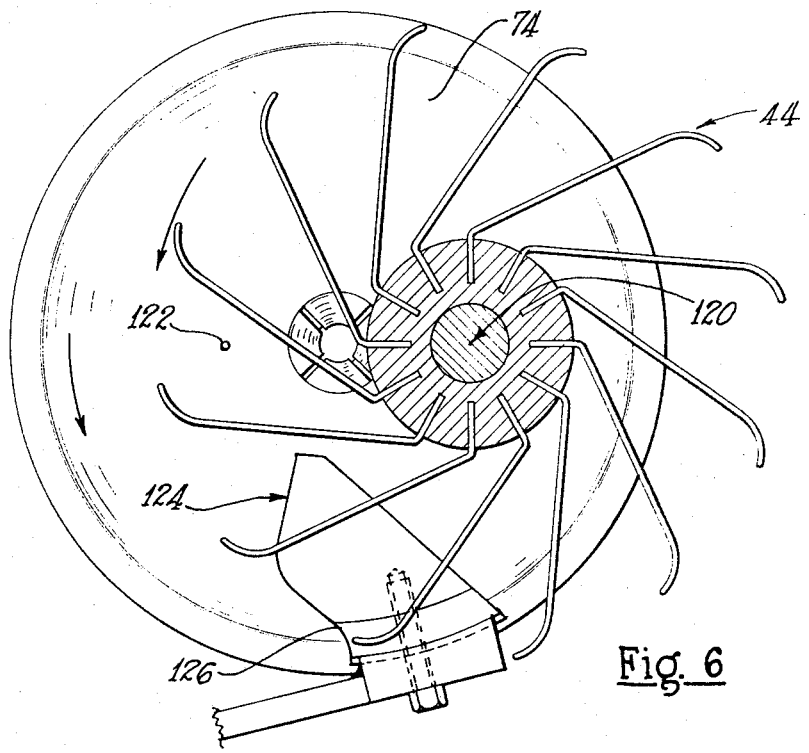
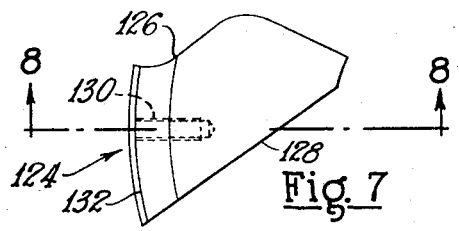
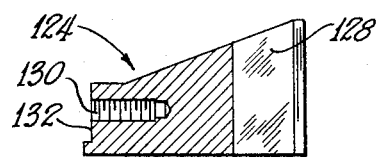
INVENTORS
GUSTAV E. BENSON &
BY WILLIAM C. SHAFER
ATTORNEYS Oct. 14, 1969   G. E. BENSON ET AL   3,472,015
SPUN ROVING
Original Filed March 20, 1964   6 Sheets-Sheet 5
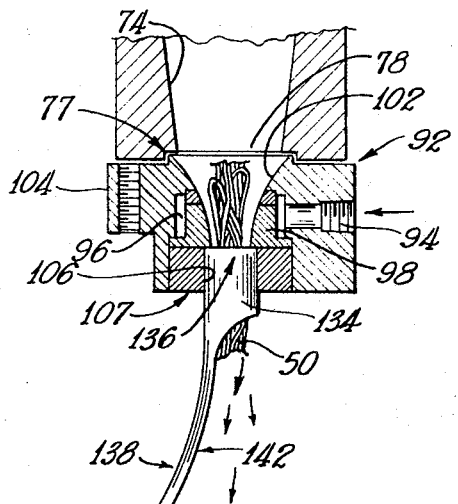
Fig. 9
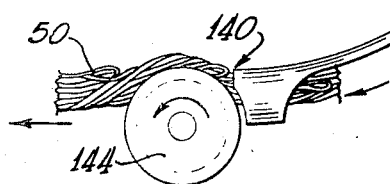
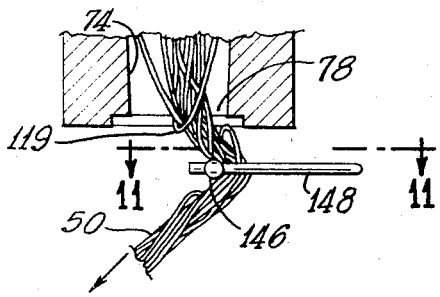
Fig. 10
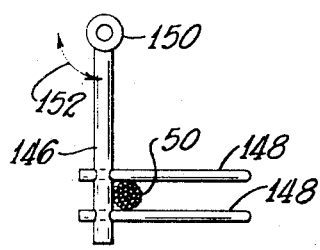
Fig. 11
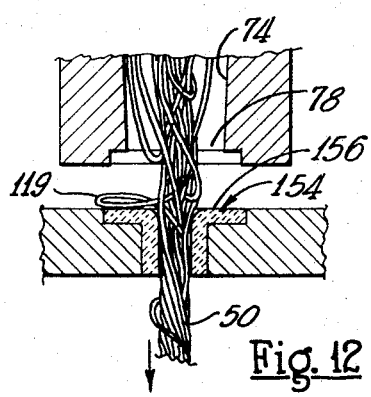
Fig. 12
INVENTORS
GUSTAV E. BENSON &
WILLIAM C. SHAFER
BY
ATTORNEYS INVENTORS
GUSTAV E. BENSON &
WILLIAM C. SHAFER
BY
Staelin & Overman
ATTORNEYS United States Patent Office 3,472,015
Patented Oct. 14, 1969

3,472,015
SPUN ROVING
Gustav E. Benson, Greenville, R.I., and William C. Shafer, Anderson, S.C., assignors to Owens-Corning Fiberglas Corporation, a corporation of Delaware
Original application Mar. 20, 1964, Ser. No. 353,457, now Patent No. 3,324,641, dated June 13, 1967. Divided and this application Feb. 10, 1967, Ser. No. 632,847
Int. Cl. D02g 3/02
U.S. Cl. 57—140                              4 Claims

ABSTRACT OF THE DISCLOSURE

A spun roving of novel construction characterized by an integral body that is tightly woven and uniformly twisted, comprising loops of continuous strand positioned in successive intertwined relationship along the length, and with minor portions of the loops in their original coherent form, extending outwardly from the main body at uniformly spaced points along the length.

---

This is a division of copending application Ser. No. 353,457, filed Mar. 20, 1964, now Patent No. 3,324,641.

This invention relates to novel spun roving characterized by improved integrity and quality of construction, and to apparatus and process for producing the novel spun roving on a continuous basis, both characterized by improved efficiency and economy.

THE ESSENCE OF THE PRIOR ART

The use of roving as reinforcement for plastic laminates has been rather widely extended since World War II. According to the prior art, this has been made by first forming a continuous strand from a plurality of molten streams of glass. Thereafter, a plurality of the so-formed strands were run through guides and gathered into parallel, side-by-side relation and formed into a multi-strand roving. Thereafter, such roving was either formed into a random laid mat for reinforcement purposes in plastic laminates or chopped to form short, loose lengths for use in plastic laminates as reinforcement.

From the foregoing, it will be evident that in the prior art operations a substantial amount of lost motion resulted from handling, between the point of original raw fiber formation and the point where such fiber was actually incorporated into a synthetic resin laminate.

As a result of this lost motion and concomitant expense, a next logical step was taken in order to reduce the cost of this material and thus encompass a broader market.

THE PEG WHEEL CONCEPT

This comprised the direct conversion of a strand, after its formation, into a spun roving. The direct conversion was effected by pulling a plurality of fibers and forming them into a strand over a guide block and then either running the strand between a pair of pull wheels or wrapping over a single pull wheel to draw it; and then throwing the strand off into a peg wheel spinner. The spun roving was then drawn from the peg wheel and wrapped onto a package. This formed a single pass or straight-through operation from raw fiber to packaged spun roving.

While attaining a substantial degree of commercial utility, such products were limited against broadest application because of certain inherent disadvantageous characteristics in their construction, to wit:

(1) Relatively poor strand integrity;
(2) Low order of uniformity of roving construction characterized by excessive variation of roving weights or yardage and loops non-uniformly distributed along the length of the roving;
(3) Generation of a great deal of air-borne fly, causing periodic shutdown of the process to clean the surrounding equipment and working space; and
(4) A substantial number of broken filaments along the roving strand, rendering the product harsh to handling and feel.

From the foregoing, it will be evident that a substantial advance to the art would be provided by the following:

(1) Continuously formed spun roving of improved integrity;
(2) Novel apparatus for producing such improved roving; and
(3) A novel continuous process for producing the novel product characterized by improved efficiency and economy.

It is therefore an important object of the present invention to provide novel spun roving characterized by improved integrity and order of construction.

Other objects of this invention will appear in the following description and appended claims, reference being had to the accompanying drawings forming a part of this specification wherein like reference characters designate corresponding parts in the several views.

THE DRAWINGS

FIGURE 6 is a substantially full scale view similar to FIGURE 4, of a second embodiment of the invention, but with a different arrangement of the loop finger wheel with a different loop retainer element;

FIGURE 7 is a plan view of the take-off element used in FIGURE 6, in full scale;

FIGURE 8 is a sectional view taken along the line 8—8 of FIGURE 7;

FIGURE 9 is a fragmentary, sectional view, showing apparatus for gathering the spun roving product of invention "without letting go";

FIGURE 10 is a fragmentary, sectional view, illustrating an alternate means for gathering the roving, but omitting the air tucker;

FIGURE 11 is a view taken along the line 11—11 of FIGURE 10;

FIGURE 12 is a fragmentary, sectional view, illustrating another method of gathering the roving, but omitting the air tucker;

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

PERSPECTIVE VIEW

Briefly, the present invention relates to the production of spun roving, substantially improved over analogous prior art products by having the following characteristics:

(a) High degree of stran integrity; and
(b) High degree of order in roving construction as evidenced by pronounced laterally extending loops uniformly distributed along the length of the roving; and further by improved yardage uniformity as evidenced by greatly reduced foot-to-foot yardage variation.

The apparatus of invention is characterized by a novel combination of rotating loop-forming fingers operating above an inverted spinning cone gatherer; thus, there are no moving parts within the cone. This provides greater durability, and reduced and easier maintenance.

The process of invention is characterized by developing successively laid loops of continuous strand along the wall of the cone, e.g., forming such loops into a cone-like form and rotating them in such form to provide the novel products alluded to above.

In view of the foregoing brief resume, a complete description of all aspects of the invention now follows.

THE ENVIRONMENT

Figure 1:
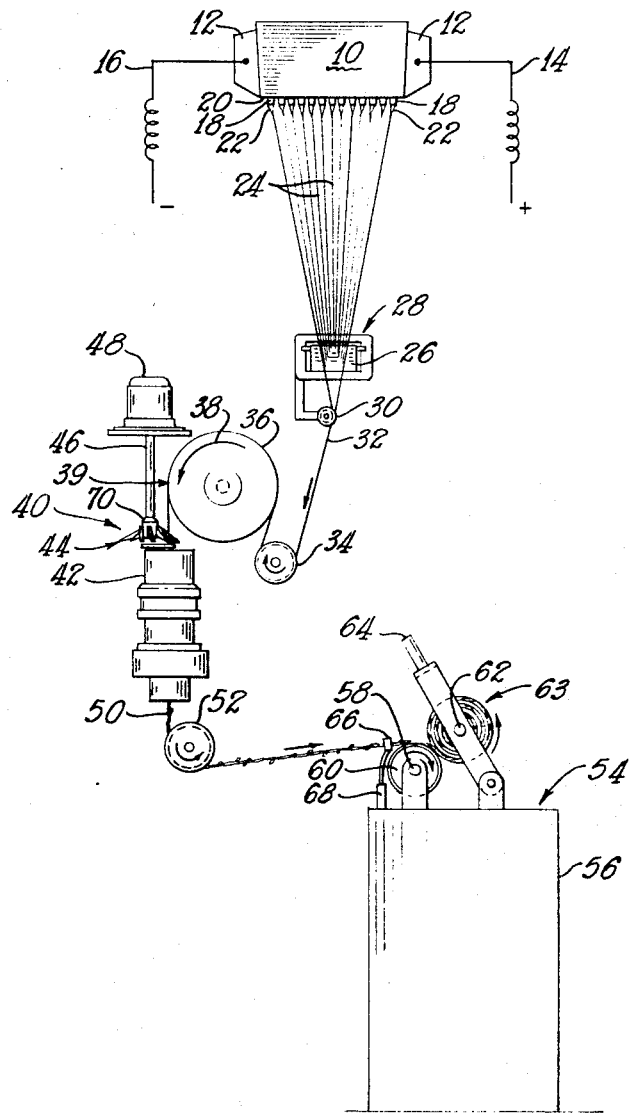
FIGURE 1 is an elevational view of apparatus for producing spun roving, including the spinning equipment of the present invention.

Referring to FIGURE 1, typical environmental surroundings of the present invention are shown. These include a glass melting bushing 10, suitably formed of high melting platinum alloy to withstand elevated temperatures for glass melting and to resist corrosion by the components of the glass being melted.

The bushing 10 is provided with terminals 12 at each end to which electrical lines 14 and 16 are connected whereby electric current is passed through the bushing to heat the same by internal resistance. A suitable insulating refractory (not shown) is provided around the bushing to retain heat and thereby improve performance and efficiency.

Although not shown, means for feeding glass marbles or powdered glass forming materials, such as cullet, is provided above the bushing to provide an operable assembly of components. The feeding mechanism is suitably a hopper and depending chute.

Glass-forming materials are fed by gravity into the bushing at a controlled rate. In the bushing 10, the materials are converted into molten glass by the elevated temperatures of the bushing. The molten glass exudes downwardly through a plurality of apertures 18 formed in the bottom 20. The molten material exudes downwardly as small molten streams 22, and these are attenuated into raw fibers 24 by a pulling operation which will become apparent later.

The fibers 24 are passed into tangential contact with a sizing belt 26 operating over a suitable roll and guide. The belt runs through a body of liquid size and binder retained within housing 28; thus, the belt is kept wetted. As the fibers 24 pass in tangential contact over an extending portion of the belt 26, they pick up a proper coating of the binder and size.

The wetted fibers are converged downwardly to a gathering guide 30, where they are passed into side-by-side contacting relationship with one another and formed into a continuous strand 32. From the gathering guide, the strand 32 passes to an idler wheel 34 that is suitably braked to provide a desired tension on the strand for lapping pull wheel 36. After partially lapping the idler wheel 34, the strand 32 then laps larger pull wheel 36 and is thrown tangentially and directly, vertically downwardly. This is indicated by the arrow direction 38. The pull wheel 36 is of specialized construction and includes fingers provided inside the wheel that push through peripheral apertures at the tangent point 39. This controls the throw of the strand from the wheel 36 at the correct point 39 and causes it to be directed vertically downwardly in proper alignment into the apparatus of invention, positioned below.

The apparatus of invention is designated generally by the reference numeral 40 and includes a rotatable spin cylinder 42 having the interior formed as an inverted, truncated cone. This is suitably rotated by being belted to a motor, as will become apparent hereafter.

Above the spin cylinder 42 and out of axial alignment with it, there is provided a rotatable pin wheel 44 that is mounted on the lower end of a vertically disposed shaft 46 of a driving motor 48. As will become evident from the following description, the pin wheel 44 is synchronized for appropriate rotation with the spin cylinder 42. This synchronization is adjustable and allows the use of a wide number of fixed ratios between spinner and cone, that are selectable, for a wide range of product variations.

The actual speed will be dependent upon a number of factors, including strand pulling speed, the number of fingers in pin wheel 44, and the speed of the spin cylinder as determined by take-up speed of winder 54, the end equivalency of the roving the operator wishes to produce, and the twist per foot or turns per foot the end product requires.

Suffice it to say at the present point that spun roving is produced within the apparatus 40 and exits from the bottom thereof as a spun roving 50.

The spun roving 50 partially laps a guide wheel 52 and thence is directed to a winding machine, designated by the reference numeral 54. The machine 54 is adapted to effect a continuous pulling force on the roving 50 at a selected speed. The machine shown takes the form of a surface traction winder and comprises a housing 56, within which is mounted a motor that is operatively connected to a driven spindle 58.

A traction surface roller 60 is carried by spindle 58 and the roving 50 is passed over roller 60 to winding spindle 62. The winding spindle 62 is rotatably mounted on a pivoted frame 64 so that it can be swung forwardly into surface contact with the traction surface of roller 60. This imparts rotation to the spindle and to the accumulating mass of roving thereon.

Guide eye 66 is mounted on the upper end of an arm 68 that is reciprocated by suitable mechanism within cabinet 56 to traverse the roving back and forth across the accumulating package 63 so that the wind of the package is open and its surface generally cylindrical.

THE APPARATUS OF INVENTION

Referring to FIGURE 2, again note that the apparatus of invention is designated generally by the reference numeral 40. The spin cylinder is designated 42 and has the pin wheel 44 positioned immediately above it. As previously mentioned, the pin wheel or loop-forming finger wheel 44 is mounted upon a shaft 46 that is driven in synchronism with the spin cylinder 42 by means of drive motor 48.

A more careful look at the loop finger wheel 44 will disclose that it comprises a hub 70 that is peripherally slotted to receive the ends of the fingers 72. These are locked to hub 70 in suitable manner as by setscrews, not shown.

The fingers 72 are of plate stock and have a substantial root whereby they are connected to hub 70. Each finger 72 tapers from the root to a substantial point at the exposed end; the taper is primarily downwardly along the top surface.

Figure 4:
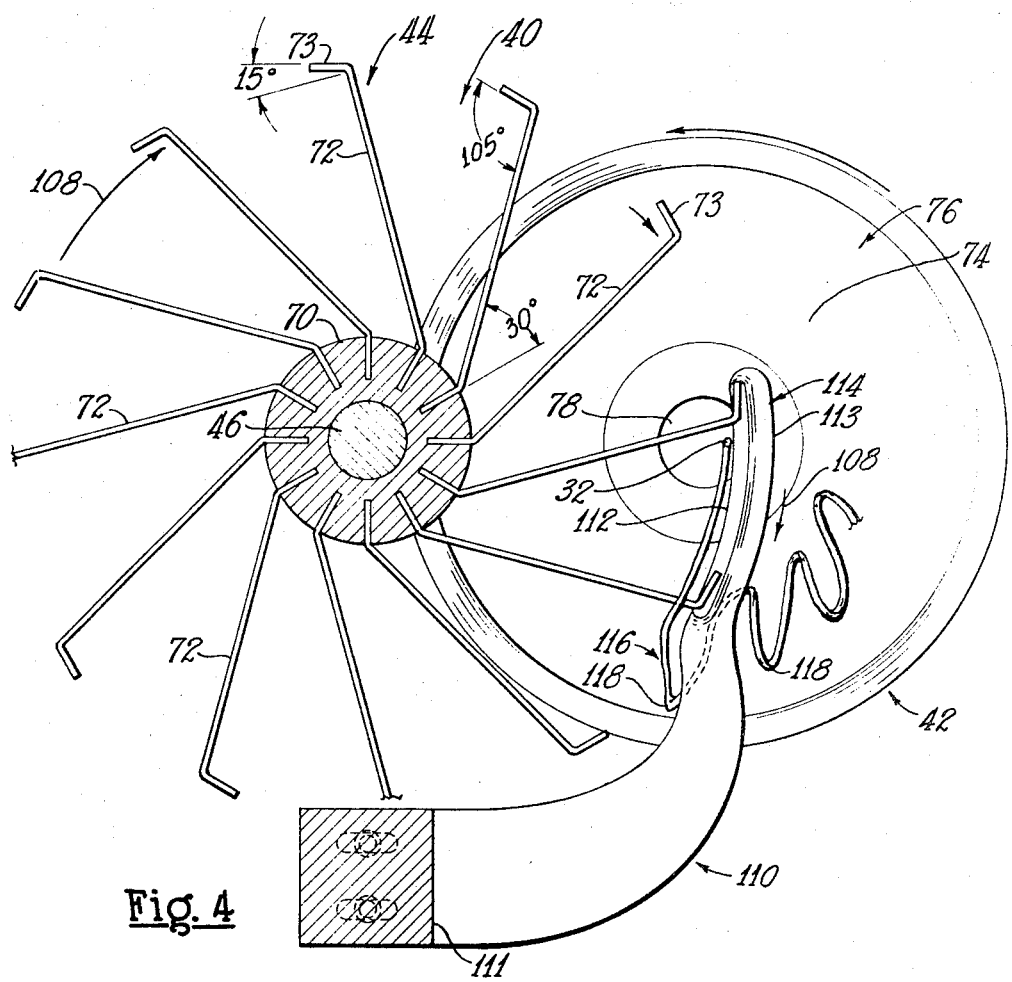
FIGURE 4 is an enlarged sectional view taken along the line 4—4 of FIGURE 2; this is substantially full scale.

As best shown in FIGURE 4, in the operating position, shaft 46 is offset, out of axial alignment with the axis of the spin cylinder 42. In this position the tips 73 of the fingers 72 extend just beyond the axis of the spin cylinder and thus intersect the downwardly thrown strand 32.

As shown in FIGURE 4, the body portions of fingers 72 sweep back at an angle of about 30 degrees. The terminal ends 73 sweep further back at an additional angle of about 105 degrees.

Figure 5:
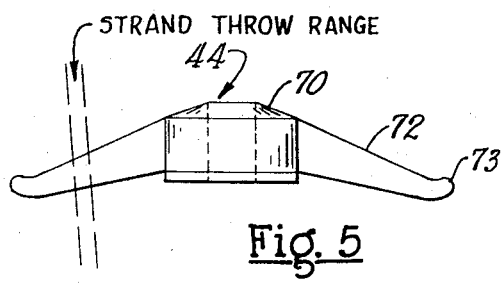
FIGURE 5 is a fragmentary, schematic elevational view of about actual size, showing the profile of the spin fingers.

As shown in FIGURE 5, the strand throw range is about ⅛ inch, along the central to end portion of each finger 72. Since the spinner position and the cone position are fixed, the proper strand throw can best be determined with the equipment in operation.

It should be pointed out that the spinner fingers can be made of brass, that is, first chromium-plated and then sandblasted to a satin finish. This finish is quite important to proper release or discharge of the loops from the spinner fingers. However, other materials of construction will become apparent to the skilled artisan and these are to be included within the scope of invention.

THE SPIN CYLINDER

Figures 2, 3:
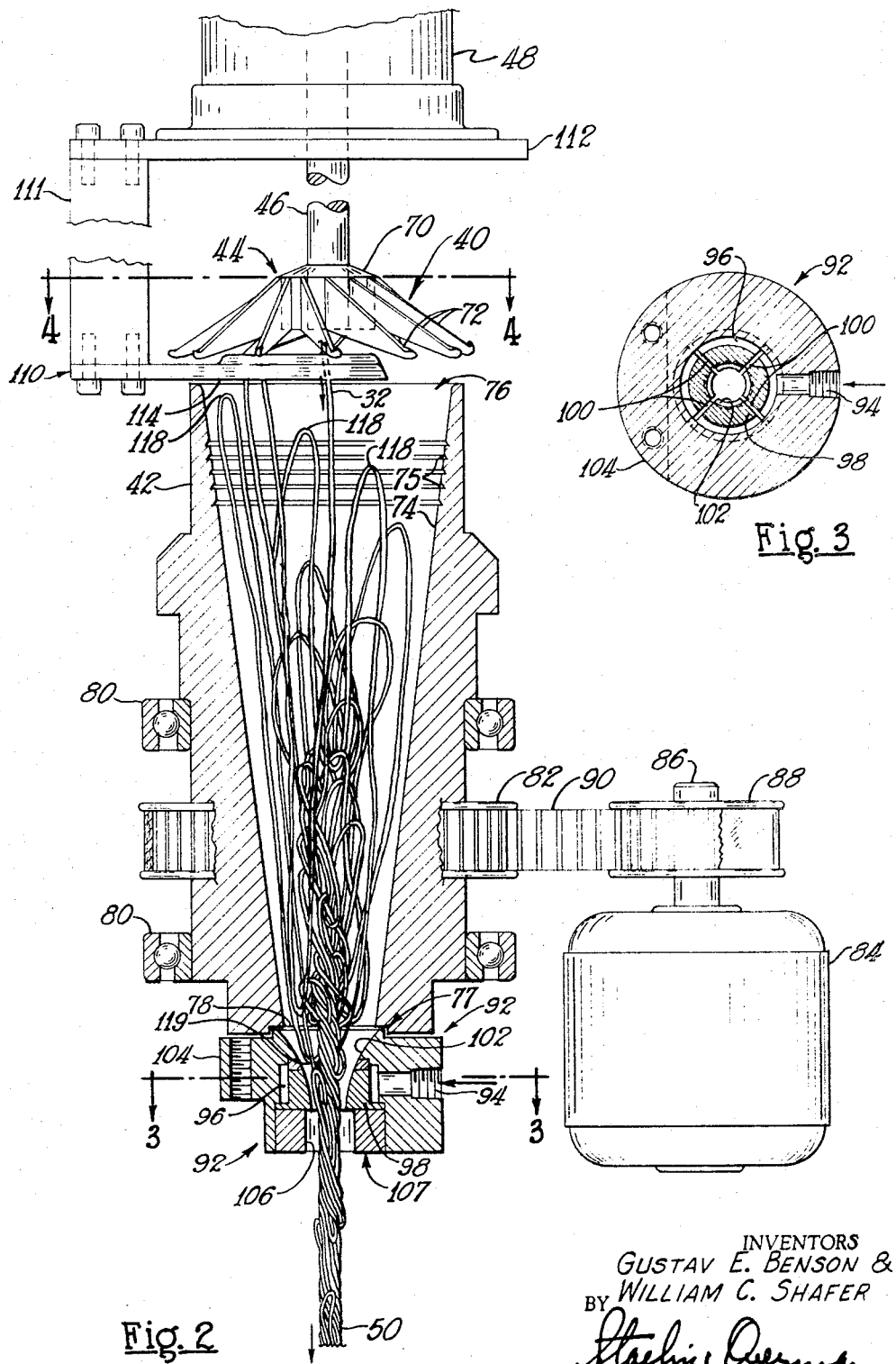
FIGURE 2 is an enlarged, fragmentary, elevational view, with the cone spinner gathering device and air tucker axially sectioned to show the manner in which the roving is formed therein.
FIGURE 3 is a sectional view taken along line 3—3 of FIGURE 2.

As shown in FIGURE 2, the spin cylinder 42 is formed internally as an inverted, truncated cone surface 74. This cone surface is of uniform profile throughout its length, tapering from an inlet mouth 76 to a smaller outlet mouth 78.

However, the surface of the inner profile is configured as a plurality of peripherally extending grooves 75 of $\frac{1}{32}$ inch depth and spaced on ⅛ inch centers. This is also shown in FIGURE 2. The purpose of these grooves is to prevent adherence by the moist strand. A sandblast finish is also operable to prevent adherence by the moist strand.

These grooves 75 are useful, depending upon the type of product being produced. Thus in a 450's operation, and certain other sliver-size combinations, they are helpful to prevent the strand from sticking to the spinner cone. However, a smooth ungrooved surface has proven superior with heavier slivers and sizes used for conventional spun rovings such as now being produced on peg wheel equipment.

The spin cylinder 42, as its name implies, is mounted for rotary operation. For this purpose, bearings 80 are provided, with the races embracing the outside of the cylinder 42; the cones are mounted in a surrounding support housing, not shown. A sheave 82 is mounted in surrounding relationship to the body of the spin cylinder 42 and fastened in fixed relation, to receive driving power.

A motor 84 is mounted on a suitable frame, not shown, and has a shaft 86 mounting a drive pulley 88. A belt 90 laps pulley 88 and sheave 82 to provide a driving relation between the motor 84 and the spin cylinder 42.

AIR TUCKER

The apparatus previously described is per se capable of producing superior roving as compared to that heretofore produced by the prior art. However, the method of operation which will be shown hereinafter is capable of producing an even more highly refined product when an air tucker or slotted blower is used in combination. It should also be noted that the blower is novel per se, as well as the product made by it, per se.

Thus, by further reference to FIGURE 2, it is will be noted that the air tucker is provided adjacent to the outlet mouth 78 of the truncated forming cone 74.

The air tucker comprises a small blower designated generally by the reference numeral 92. This includes an air inlet conduit 94 leading to a circular manifold chamber 96 (also see FIGURE 3). Within the chamber 96 is an annular wall 98 having four radially extending slots 100 (see FIGURE 3). These are exactly 90° apart. In FIGURE 2, it will be noted that the inner profile of the wall 98, in vertical section, is that of a vortex 102.

It will be noted that an annular wall 104 provides the outer casing of the air blower 92.

The bottom of the air blower 92 is formed as a tubular bore 106 through which the spun roving 50 exits in a downward direction. A tube collar insert 107 carries the bore 106, which is slightly larger than the exit opening of the wall 102. Tube collar insert 107 is a press fit in an appropriate bore formed in wall 104 to retain wall 98.

Note that the bottom of the cone 74 and cylinder 42 are provided with an annular groove 77 to embrace the top of the wall 102 in close running relation. Note here the manner in which the top of wall 102 projects upwardly as an annular ring.

This prevents air from inlet 94 from being lost at this point. The general arrangement causes the air to be ejected downwardly around the spun roving 50 as it exits from bore 106.

Note also that the wall 98 is oriented so that the inlet 94 does not straddle a slot 100. Instead, incoming gas from inlet 94 impinges against wall 98 between two slots 100.

This is the only blower known that will produce filament entangled texturized strands at forming speeds. Prior to this time, blowers have been used that would produce texturized yarn from previously formed strand—but at much lower than forming speeds. Therefore, no blower has been known that would produce texturized strands at forming speeds of 10,000 to 12,000 feet per minute.

The blower of this invention is not only novel; but also the product per se made by it is inherently novel.

As regards the vortex throat of this blower, there is no whirling of the gas stream within the throat. Slots 100 are at exactly 90° spacing. The roving production action is believed to be produced by the directly opposed jets of gas colliding with one another head on, to produce a highly turbulent mixing zone of gas that is turbulent in all directions, twisting, crossing, and recrossing both vertically and horizontally.

Further, this blower is believed to operate because of its extremely high velocity effect and the unique manner in which most of the gas passes out the bottom of the blower with a small amount of air backing up through the inlet mouth. Further, it will be understood that the high velocity will result because there is no mass to render turbulent other than the gas itself.

THE COOPERATIVE RELATIONSHIP OF THE LOOP-FINGER WHEEL 44 AND THE RETAINER ELEMENT

The cooperative relationship of the loop-finger wheel 44 and the spinning cone 74 is best shown by reference to FIGURE 4. Also, this figure of the drawings illustrates the loop retainer and the manner in which it guides the loops formed by the fingers 72, into a particular lay against the side of the cone surface 74.

Note the offset relationship of the hub 70 from the axis of the spinning surface 74. This causes the loop fingers 72 to sweep generally across the mouth 76 of surface 74 to pick up the strand along the length of the fingers. With the incoming strand 32 moving coaxially downwardly into the mouth 76, each loop finger 72 picks up a loop and moves it in the arrow 108 direction; this movement is effective ultimately to move the loop into contact with the conical surface 74.

THE RETAINER ELEMENT

To make certain that the loops are discharged from each of the loop fingers 72 at an appropriate position on the truncated cone wall 74, a loop or catenary retainer member 110 is provided. It will be noted in FIGURE 2 that this member is supported from a bracket member 111 that extends upwardly into contact with the support 112 for the motor 48. This assures that both the loop finger wheel 44 and the retainer member 110 are always in appropriate functional relation with one another. By so operating, these two units can be swung out of the way, in retained operable relationship, to facilitate cleaning the truncated cone surface as by flushing with water when necessary.

In FIGURE 4, the retainer member 110 is shown as essentially a plate-shaped arm member 114 having an outer curved surface 113 approximately the same profile as the outside diameter of the spin cylinder 42. The inside surface 112 reverse curves at the end to join with the surface 113. The outer end of arm 114 extends out, slightly beyond the axis of the conical surface 74. At the median portion arm 114 cuts back to form a pocket 116 where the loops are positively removed from the ends 73 of the loop fingers 72 and laid in orderly fashion against the side of the truncated conical surface 74.

The purpose of retainer 114 is to retain the strand on a finger 72 until the next succeeding finger becomes draped with the strand thus forming a catenary or endless loop between these two fingers. This prevents premature strand removal, otherwise resulting in random catenary lengths in operation, which in turn would result in uneven roving yardage or poor uniformity. The speed of hub 70, the number of fingers 72, and the strand delivery rate from pull wheel 38 in feet per minute determine catenary length. Strand will automatically remove itelf or be pulled from spin fingers 72 due to inertia, centrifugal force, the finger configuration, and the downward pull on the strand due to the lower portion of the catenary becoming entangled in the twisted roving, which in turn is being pulled from the cone by winder 54. The strand's attraction to the inner cone surface will also remove strand from fingers 72 if entanglement does not occur. Thus, the retainer fixes the catenary or loop length and more precisely lays the loop against the cone interior at a given position determined by the relief area of the arm at which point the pocket 116 is positioned and where the strand is pulled from a finger.

OPERATION SUMMARY

From the foregoing discussion relative to FIGURES 2, 3, and 4, it will be understood that a single end or strand, designated 32 in FIGURE 2, is injected or thrown at high velocity axially into the mouth 76 of the inverted truncated cone form 74. As it does, it is periodically interrupted by the transversely moving loop-forming fingers 72. As these move across the path of the entering strand, they gather consecutive loops 118 between them.

The fingers 72 are then successively cut back out of the way over removal pocket 116, permitting the loops to be successively removed from the fingers both by centrifugal force and by the pulling action of the strand as it "licks" to the cone surface 74.

It should be noted in FIGURE 2 that the bight 119 of initially formed catenary loop 118 extends substantially to the bottom of wall 74 for positive intertwining or entanglement with previously formed, rope-like roving construction.

As shown in FIGURES 2 and 4, the centrifugal force of the spinning conical wall causes the loops to be laid or held against that wall, one upon the other in ordered progression. Rotation of the conical surface 74 causes the loops to be built around the wall and to be positively intertwined with one another.

The loops "lick" to the cone surface 74 because of the moisture contained in the sizing applied at 26 in FIGURE 1 and by centrifugal force.

The entanglement of the bight 119 of a loop 118 as it is initially formed engages it with the roving; and this causes the loop to be pulled down along wall 74 in a spiral pattern.

The draw apparatus 54 in FIGURE 1 is effective to pull the spun roving 50 downwardly through the unit at a rate commensurate with its rate of formation.

The air tucker 92 of FIGURE 2 is effective through the four slots 100, FIGURE 3, to tuck the ends and also portions intermediate the ends into a fairly tight wrap as the roving proceeds through the vortex profile wall 98.

While the foregoing description has related to the injection of a single end continuous strand 32 coaxially into the inverted, truncated, conical surface 74, other positions are to be included within the scope of invention. Thus, an off-center position can be utilized and when so operating, a loop-retainer member of slightly different configuration may be used and this is shown in FIGURES 6, 7, and 8. It will be evident that this unit is operable with the strand being injected in an off-axis position and the loop finger wheel 44 appropriately positioned for cooperable relation. Further discussion of this embodiment now follows.

THE APPARATUS—A SECOND EMBODIMENT

FIGURE 6 shows an ideal position 120 for the axis of the finger wheel 44 to be about one inch from the axis of the cone surface 74, toward the three o'clock position. This point is designated 120. An ideal strand throw position 122 is shown as being about ¾ to one inch off cone axis, toward the nine o'clock position.

FIGURE 5 shows a fairly accurate strand throw range for this embodiment. Thus, more favorable conditions include a strand throw range of about ⅛", intersecting the fingers between midpoint of the fingers to slightly below the midpoint.

In this embodiment of the invention, the loop retainer 124 is shown in FIGURES 7 and 8. This is a short, stubby unit as compared to the longer unit 114 of FIGURE 4.

The unit 124 of this second embodiment is of generally triangular shape in plan, with a generally S-shaped curve 126 on the front side and with a flat rear side 128. A tapped hole 130 in the body of the unit accepts a machine bolt (not shown) for connection to a suitable bracket arm of the nature of 110 in FIGURE 2. By reference to FIGURE 8, the configuration of such bracket arm will be evident as complementing the attachment side 132.

The position of the unit 124 for take-off is shown in FIGURE 6.

Note that there is a common direction of rotation of the cone spinner and of the loop finger wheel 44.

FIGURE 6 actually represents an operation where the strand is removed from the fingers by existent forces imposed by the system. The loop remover 124 is actually a safeguard and serves to remove loops which occasionally refuse to release.

OPERATIONAL DATA

Figure 15:
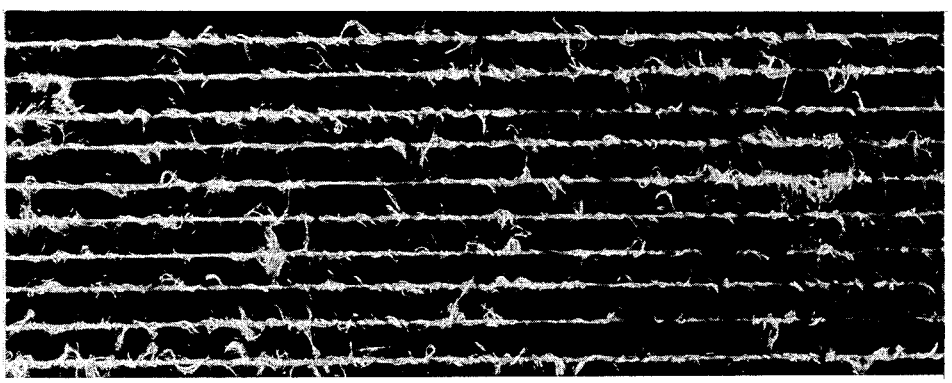
FIGURE 15 is an actual size photograph of the novel product of invention made by using the cone spinner in combination with the slotted blower.

In a preferred embodiment, the loop finger wheel 44 is rotated at a speed to approximately yield a loop length equal to the spin cylinder length. This, as will be discussed below, produces a very coherent but high bulk product which is an ideal reinforcement material for synthetic resin laminates and for weaving into cloth. This product is shown in FIGURE 15 of the drawings and is discussed in detail later. Also within the scope of invention, it is to be understood that the spin ratio may be higher or lower to give a tighter, more highly twisted product or a lesser twisted, lighter product.

Typical operating data for manufacturing the product shown in FIGURE 15 are as follows:

Cone speed _____ 8000 r.p.m.
Spin finger speed (using 5 fingers) __ 1135 r.p.m.
Winder speed _____ 375 plus or minus 5 fingers.

Figure 13:
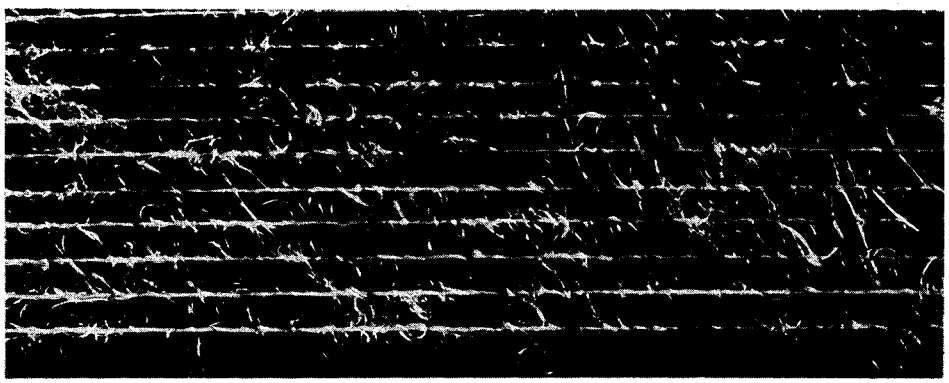
FIGURE 13 is an actual size photograph of the product made by the cone spinner and peg wheel only.
Figure 14:
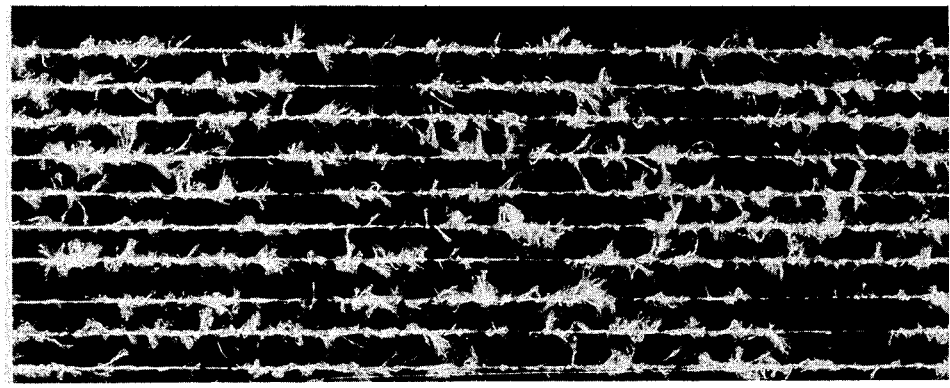
FIGURE 14 is an actual size photograph of the novel product made by the slotted blower only.

As regards operation of the apparatus of invention it is, of course, to be understood that the air tucker 92 is to be considered optional for use depending on which of the products of FIGURES 13, 14, and 15 is to be produced.

EXTENSION OF THE INVENTION RELATIVE TO FIGURES 4–8, INCLUSIVE

Both finger configurations as shown in FIGURES 4 and 6 and both loop retainer members as shown in FIGURES 4 and 7 can be made to work either with off axis strand delivery or with axial strand delivery. The general angle of strand delivery into the cone does not dictate these design changes.

Also the finger configuration of FIGURE 6 works equally well with loop retainer 114 of FIGURE 4.

In the event of a wild throw of strand from the surface of pull wheel 38, entanglement of the strand around the spin fingers and subsequent process interruption occurs. It is due to this phenomenon that a removal element such as shown in FIGURE 7 was used in conjunction with retaining arm 114 of FIGURE 4 as a safety element in certain cases (as in pulling double strands) where the frequency of "finger wraps" proved to be excessive.

PRESERVING ROVING INTEGRITY

FIGURE 9 illustrates the meaning of an aspect important to the present invention, as regards production of a fly-free roving. Thus, "never let go of the roving" or "keep the roving frictionally engaged with a surface to eliminate vibration and thus preserve integrity."

As shown in FIGURE 9, a tube 134 has an inlet end 136 positioned against the outlet bore 106 of blower 92. This tube 134 is provided with a smooth bend, as along the area 138, between the inlet end 136 and the outlet end 140. The backside of tube 134 is cut away, as indicated along area 142. The cut-away portion 142 permits the blower air to be released to the ambient atmosphere.

The roving 50 is passed along the tube, being kept against the remaining portion, designated by bend area 138, and thus held steady against vibration.

As the roving 50 exits from the outlet end 140, it passes over a guide roll 144, and thence to the winding machine 54, of the same nature as indicated in FIGURE 1.

ALTERNATE MEANS FOR REMOVING ROVING FROM THE CONE SPINNER

As shown in FIGURES 10 and 11, the bottom 119 of each loop 118 projects downwardly through the opening 78 in the bottom of the cone 74 to become entangled in the roving 50. The roving 50 is thereafter drawn at an angle over a rod 146 and between spaced pins 148. Pins 148 are carried by and project from the rod 146. Then the roving 50 is directed at a reverse angle, to a winding machine of the nature of 54 in FIGURE 1. It will be noted that rod 146 may be pivoted on its mounting end 150, according to the arrow direction 152, to permit lace-up of the apparatus.

Also, as shown in FIGURE 12, the roving 50 can be drawn through a ceramic guide eye 154. Loose loops, or the bight 119 of a loop, will be thrown to the surface 156 in which the guide eye 154 is mounted. Then, while "licking" to this surface 156, the loop or bight 119 will become entangled with the roving and thus drawn into the issuing spun roving product 50.

Actually the bight is twisted around the exterior of the roving. At this point the roving it tightly twisted and penetration of the bight into this construction would be difficult, if not impossible without the air blower.

These alternative means for removing roving from the cone spinner improve the product in the same manner as the apparatus shown in FIGURE 9. The contribution lies in stabilizing the conical web formed by the twisting of the catenaries, and holding this conical web at the apex in such a manner as to guarantee locational stability relative to surrounding mechanisms both rotating or stationary. This provides a stationary target at which to direct the lower ends of the incoming catenaries, thus improving the possibilities of catenary penetration through web and/or becoming entangled in apex of web. If locational instability of the conical web exists, instability of operation occurs, and product properties vary.

THE PRODUCTS OF INVENTION

In FIGURE 15, the product alluded to above as made using cone spinner, finger wheel and blower is observed to be of coherent body with loops lying along the length of the roving in highly ordered fashion. The loops project outwardly in a substantially transverse arrangement. Note also that the body of the roving is substantially cylindrical; of tight-twist; and with minor portions of the loops only extending out from the body at relatively uniformly spaced points along the length.

Actually in the truest sense, it might be stated that the loops are randomly spaced. There are, however, no long lengths without loops, for example, 3 to 10 inches, as evident in prior products such as produced by the old peg wheel spinner. Thus, loop spacing is much more uniform than in the prior products.

The proportion of the projecting ends does not exceed about ten percent of the total weight of the roving and, thus, the product is characterized by improved uniformity of integrity and strength because of its coherent fabrication.

In FIGURE 14, the product made by the blower or air tucker alone will be observed to have a very tight body and very fuzzy and less coherent loops projecting from the surface at a random order of position along the length.

This illustrates the fact that the air tucker 92 by itself tends to disperse the individual filaments relative to one another as in a texturizing process. Evidence of this can be seen by comparing FIGURE 14 with FIGURES 13 and 15. Thus, this unit by itself would not technically produce a spun roving, but instead would actually produce a texturized yarn or texturized strand. However, when used in combination with the mechanism of FIGURES 9–12, inclusive, and the cone spinner and finger wheel, a tight wrap is provided as in the product of FIGURE 15. This illustrates the versatility of the present invention.

In FIGURE 13, the product resulting from the use of the cone spinner and finger wheel alone is observed to have much less coherency than either of the other two products, but this is not to say that it does not have utility for at least certain applications. This product should render a very high quality filler mat.

The product of FIGURE 15 provides a greatly improved medium for many uses. An important one of such uses is for the production of synthetic resin laminates wherein the product is used as a reinforcement material therein. Thus, it may be used in continuous form as a random laid mat for reinforcement purposes. Also it can be chopped into short lengths; and such short lengths can be formed into a random laid mat with the chopped lengths laid in random criss-cross array relative to one another. A suitable bonding agent, of course, as known in this art will be used to provide a coherent mass, such bonding agent being compatible with ultimate resins to be reinforced. This chopped mat also forms an ideal reinforcement.

By its open structure and pattern of extending loops, the novel spun roving of invention has thorough wet-out by resins, whether the roving is used in chopped or continuous mat form.

This product also has an unexpected use for weaving into cloth, something quite unique or a spun roving material. This is an ideal material for weaving into nubby fabrics for use in draperies and the like.

THE PROCESS OF INVENTION

From the foregoing, it will be evident that a process is inherent in the present invention, comprising the following steps:

(1) Forming successive loops from a single continuous strand moving continuously in a linear manner. Successively moving the loops into a rotating conical form and thereby twisting the loops with one another.

(2) Simultaneously with the formation of the loops into a conical form or pattern, moving the twisted loops axially of the small end of such conical form.

EXTENDED SCOPE OF INVENTION

Materials of construction useful for production of the device of the present invention comprise aluminum; and, as will be obvious, the cone surface 74 must be carefully finished and well balanced for high speed rotation.

With some corrosive plastic sizes, a protective chromium plating may be necessary on the interior of the cone. Also a corrosion-resistant material can be used to fabricate the cone, where corrosive sizes are being processed.

Materials for and finish of the loop fingers have been discussed above.

ADVANTAGES OF THE PRESENT INVENTION

From the foregoing, it will be evident that a number of advantages are inherent in the present invention over the prior art. These are as follows:

(1) One of the most obvious is that there are no loops whirling around in the air prior to collection, to generate "fly." By having the loops move directly into the cone form, all parts of the roving are retained and there is no possibility of fly being generated. Fly is the result of bits and pieces of the strand being broken and thrown away as well as bits of the size being thrown as a fine mist during the spinning of the loop in the air.

(2) A further advantage of the present invention is the uniformity of product produced and the range of products which can be provided by the apparatus of invention.

(3) A still further advantage of the invention resides in a highly compact production unit requiring very little floor space.

(4) Still further, it will be evident that a much cleaner operation is provided, and housekeeping problems are considerably improved.

(5) Another advantage is that the loop forming fingers are exposed. Thus substitution of a new looper wheel as required because of wear, is greatly simplified and does not require dismantling the apparatus.

We claim:

1. A spun roving having a generally cylindrical body comprising a plurality of intertwisted loops positioned in successive relationship along the length of the roving to form a coherent mass.
   and with minor portions of loops extending transversely outwardly from said tubular body at uniformly spaced points along the length,
   the spun roving having a tightly woven and uniformly twisted body, comprising loops of continuous strand positioned in successive intertwined relationship along the length of the roving.
   minor portions of said loops extending outwardly from said roving at uniformly spaced points along the length,
   and the portion of said projection loop ends not exceeding about 10% of the weight of said roving.

2. A spun roving having a generally cylindrical body comprising a plurality of intertwisted loops positioned in successive relation along its length to form a coherent mass,
   and with minor portions of said loops extending outwardly from said body at uniformly spaced points along the length.

3. A spun roving having a substantially cylindrical, tightly woven and uniformly twisted body, comprising loops of continuous strand positioned in successive intertwisted relation along the length of the roving,
   minor portions of said loops extending outwardly from said body at uniformly spaced points along the length of said body,
   and the proportion of said projecting loop ends not exceeding about 10% of the weight of the roving.

4. A spun roving,
   comprising a generally cylindrical, cord-like twisted body providing a coherent core of substantial strength and uniform integrity,
   said body being made up of a plurality of loops of continuous strand, the loops successively positioned along the length of said body and intertwisted in a common direction to provide integrity and strength,
   minor portions of said loops extending outwardly from said roving at substantially uniformly spaced points along the length, and said extending portions having a maximum extension not exceeding about four times the diameter of said body,
   and the proportion of said projecting loops not exceeding about 10% of the total weight of said roving.

References Cited

UNITED STATES PATENTS

| | | | |
|---|---|---|---|
| 2,911,784 | 11/1959 | Vandervoort | 57—34 XR |
| 2,924,868 | 2/1960 | Dyer | 57—34 XR |
| 2,942,402 | 6/1960 | Palm | 57—34 |
| 3,020,699 | 2/1962 | Nijkamp et al. | |
| 3,030,690 | 4/1962 | Mizell | 28—72 |
| 3,082,591 | 3/1963 | Marshall | 57—6 |
| 3,104,516 | 9/1963 | Field | 57—157 |
| 3,118,213 | 1/1964 | Benson | 57—34 XR |
| 3,177,557 | 4/1965 | White | 57—34 XR |

DONALD E. WATKINS, Primary Examiner